United States Patent [19]

Foerster et al.

[11] 3,787,615

[45] Jan. 22, 1974

[54] METHOD AND APPARATUS FOR SYNCHRONIZING A VIDEOSIGNAL REPRODUCED FROM A TAPE BY MEANS OF A ROTATING HEAD WHEEL

[75] Inventors: Hubert Foerster, Darmstadt; Ulrich Brauch, Nieder-Beerbach, both of Germany

[73] Assignee: Robert Bosch Fernsehanlagen GmbH, Darmstadt, Germany

[22] Filed: May 19, 1972

[21] Appl. No.: 254,911

[30] Foreign Application Priority Data

May 19, 1971 Germany................P 21 24 923.0

[52] U.S. Cl. ........................ 178/6.6 P, 179/100.2 S

[51] Int. Cl. .......................... H04n 5/76, G11b 5/00

[58] Field of Search. 178/6.6 P, 6.6 A; 179/100.2 S, 179/100.2 T; 318/310, 311

[56] References Cited

UNITED STATES PATENTS

| | | | |
|---|---|---|---|
| 3,643,012 | 2/1972 | Clark et al. | 178/6.6 A |
| 3,666,883 | 5/1972 | Yano et al. | 178/6.6 P |
| 3,686,432 | 8/1972 | Deguchi et al. | 178/6.6 P |

*Primary Examiner*—Raulfe B. Zache
*Attorney, Agent, or Firm*—Littlepage, Quaintance, Murphy & Dobyns

[57] ABSTRACT

Method and apparatus for synchronizing a video signal with reference signals to shorten the run-in period of video tape recorders.

8 Claims, 2 Drawing Figures

METHOD AND APPARATUS FOR SYNCHRONIZING A VIDEOSIGNAL REPRODUCED FROM A TAPE BY MEANS OF A ROTATING HEAD WHEEL

BACKGROUND OF THE INVENTION

1. Field of the Invention

The invention relates to a method and an apparatus for synchronizing a video signal, especially a color television signal reproduced from a tape by means of a rotating head wheel with reference signals, where additional control signals are provided for synchronizing the head wheel rotation and the tape transport and indicating pulses are provided for providing a standardized timing of the video signals recorded on the tape.

In synchronizing a video signal recorded on a tape with reference signals produced, for example, by a timing generator in addition to the coincidence between the horizontal and vertical sync pulses, it is necessary to provide a standardized timing of the frames.

In reproducing monochrome television signals, the coincidence of the even-numbered and the odd-numbered frames with the corresponding reference signals is necessary. In reproducing color television signals, four frames should be synchronized with the corresponding reference signals.

2. Description of the Prior Art

To achieve this coincidence, it is well known in the art to compare the phase of indicating pulses with the phase of a corresponding reference signal. If there is no coincidence, the tape velocity is changed until the coincidence is achieved.

As a result of the relatively long time between the successive indicating pulses, the run-in period needs along time, for example, several some seconds for color televison signals.

Generally this long run-in time is disadvantageous because the tape recorder has to be started this long in advance before it achieves the synchronous operation mode.

SUMMARY OF THE INVENTION

This invention allows shortening of the run-in time of video tape recorders.

The invention is characterized by the feature that the control pulses reproduced from the tape and the corresponding reference pulse are counted beginning after each indicating pulse, that the counting results are compared, and, using the result of the comparison, the tape velocity is changed until the result of the comparison has achieved a predetermined value.

Applying the method according to the invention, the coincidence of the indicating pulses with the corresponding reference pulses is already analysed before the indicating pulses themselves are able to be compared. Therefore the run-in time of the video tape recorder is shortened to as low as less than a half second.

In a special embodiment of the invention, the tape velocity is changed at a constant rate during the period when the result of the comparison deviates from the predetermined value and approaches the nominal value when the result of the comparison is achieving the predetermined value.

This embodiment of the invention can be realized in an simple manner with low costs. The deviation from the nominal velocity should not be to large, for example, not more than 20 to 30 percent, in order to enable a disturbance-free change-over from the changed velocity to the nominal velocity.

According to a further embodiment of the invention, the tape velocity is controlled as a function of the result of the comparison. The deviation from the nominal value of the velocity might be, for example, proportional to the result of the comparison. If the result of the comparison is large, the velocity is large too and is decreasing in accordance to the decreasing of the result of the comparison until the nominal velocity is achieved. The initial tape velocity might be higher than in the previously described embodiments, providing a further diminuation of the run-in time.

To provide that the tape velocity is changed that direction in which the error becomes smaller, the system according to the invention can be improved in such a manner that the tape velocity becomes diminished or increased according to whether the result of the comparison is larger or smaller than the half number of the control pulses between two successive indicating pulses.

BRIEF DESCRIPTION OF THE DRAWINGS

The invention will be explained based upon the figures showing embodiments of the invention.

Figure 1:
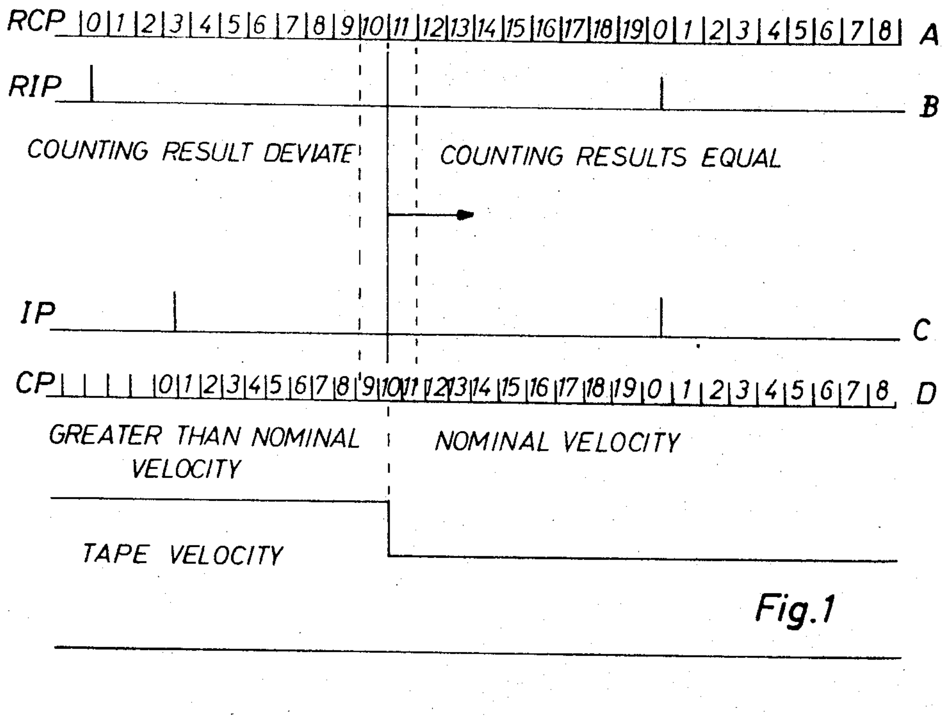
FIG. 1 shows pulse diagrams to explain the function of the method according to the invention.

Line B of FIG. 1 illustrates indicating pulses RIP and line A illustrates control pulses RCP with which the reproduced video signal is to be synchronized. If the recorded signal is a color television signal according to the European standard, the indicating pulses have a frequency of 12.5 Hz and the frequency of the control pulses is 250 Hz. The corresponding periods are 80msec and 4 msec. Between two successive indicating pulses, twenty control pulses occur.

Lines C and D illustrate indicating pulses IP and control pulses CP being reproduced from the tape. The indicating pulses shown at the left side of FIG. 1 are not coincident. After the first indicating pulse in line B and the first one in line C, the control pulse, shown in lines A and D are counted.

Because the counting results deviate, the tape velocity is, for example, 25 percent higher than the nominal velocity. Consequently the frequency of the reproduced control pulses (line D) is higher than the frequency of the reference control pulses (line A). The difference of the counting results decreases continuously until the counting results become balanced. At this moment the tape driving means are switched over to the nominal velocity. Now the control pulses CP succeed with the same frequency as the reference control pulses. When the following indicating pulse is reproduced, it has approximately the correct timing. By this it appears that the coincidence of the indicating pulse is achieved more rapidly by counting the control pulses than by the known phase comparison of the indicating pulses.

DESCRIPTION OF THE PREFERRED EMBODIMENT

Figure 2:
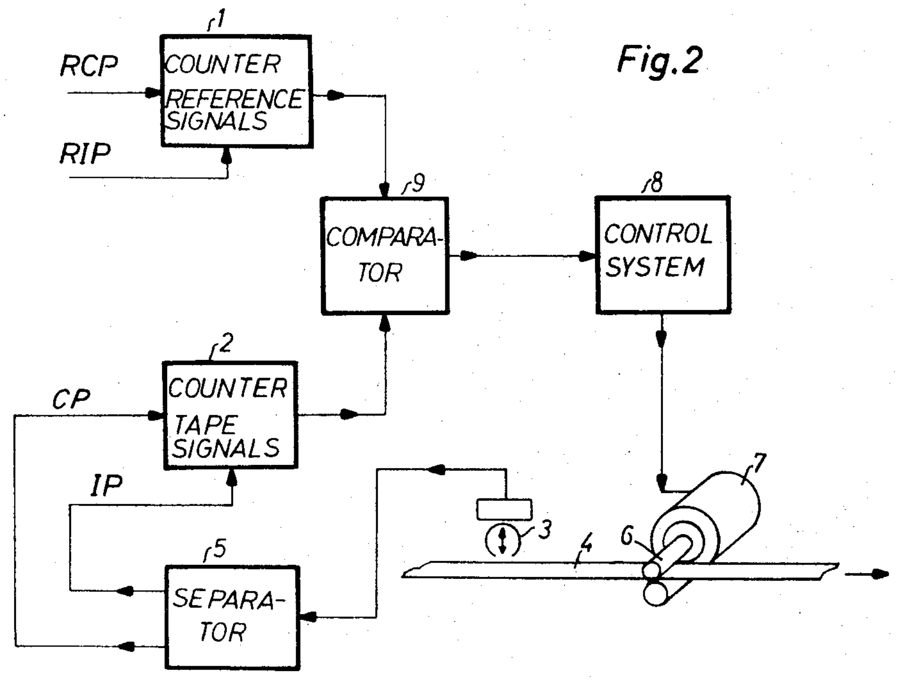
FIG. 2 an embodiment of the invention as a block diagram.

The embodiment shown in FIG. 2 comprises two counters 1 and 2. The counter 1 is supplied with a reference control pulse RCP. The counter is set to zero by each reference indicating pulse with, for example, a frequency of 12.5 Hz. In the same manner the counter 2 is operated by the control pulses CP and the indicating pulses IP, both reproduced from the tape 4 by a reproducing head 3 and separated from each other by a pulse separator 5.

The tape is transported by a capstan 6 which is driven by a motor 7. The speed of the motor 7 is controlled by a control system 8 which is well known in the art.

By means of the comparator 9 the counting results are compared. If the counting results coincide, the control system 8 in supplied with the nominal value and the tape has the nominal velocity. However, if the counting results disagree, the comparator 9 supplies the control system 8 with another control value, whereby the tape is transported with higher or lower velocity which deviates, for example, about 25 percent from the nominal velocity.

When both counting results agree, the comparator is switched to the nominal value and the tape is transported with nominal speed from that time.

We claim:

1. A method for synchronizing the indicating pulses recorded in combination with the control signal in the control track of video tape with reference indicating pulses by controlling the velocity of said video tape, comprising the steps of:

A. reproducing said control signal and said indicating pulses from said video tape,
B. counting the number of periods or the number of control pulses of said control signal respectively following each indicating pulse,
C. counting the number of periods of the number of control pulses of said reference control signal respectively following each reference indicating pulse,
D. comparing the numbers of the counted control pulses and the counted reference control pulses,
E. changing the nominal velocity of said video tape so long as the difference of said numbers does not reach a predetermined number, and
F. transporting said video tape with the nominal velocity when said predetermined number is achieved.

2. A method for synchronizing the indicating pulses recorded in combination with the control signal in the control track of video tape with reference indicating pulses by controlling the velocity of said video tape, comprising the steps of:

A. reproducing said control signal and said indicating pulses from said video tape,
B. counting the number of periods or the number of control pulses of said control signal respectively following each indicating pulses,
C. counting the number of periods or the number of control pulses of said reference control signal respectively following each reference indicating pulse,
D. comparing the numbers of the counted control pulses and the counted reference control pulses,
E. changing the velocity of said video tape so long as said numbers are not equal, and
F. transporting said video tape with the nominal velocity if said numbers are equal.

3. A method for synchronizing the indicating pulses recorded in combination with the control signal in the control track of video tape with reference indicating pulses by controlling the velocity of said video tape, comprising the steps of:

A. reproducing said control signal and said indicating pulses from said video tape,
B. counting the number of periods or the number of control pulses of said control signal respectively following each indicating pulse,
C. counting the number of periods or the numbers of control pulses of said reference control signal respectively following each reference indicating pulse,
D. comparing the numbers of the counted control pulses and the counted reference control pulses,
E. changing the velocity of said video tape at a constant difference so long as the difference of said numbers does not reach a predetermined number, and
F. transporting said video tape with the nominal velocity when said predetermined number is achieved.

4. A method for synchronizing the indicating pulses recorded in combination with the control signal in the control track of video tape with reference indicating pulses by controlling the velocity of said video tape, comprising the steps of:

A. reproducing said control signal and said indicating pulses from said video tape,
B. counting the number of periods or the number of control pulses of said control signal respectively following each indicating pulse,
C. counting the number of periods or the number of control pulses of said reference control signal respectively following each reference indicating pulse,
D. comparing the numbers of the counted control pulses and the counted reference control pulses,
E. changing the velocity of said video tape dependent on the difference of said numbers so long as the difference does not reach a predetermined number, and
F. transporting said video tape with the nominal velocity when said predetermined number is achieved.

5. A method for synchronizing the indicating pulses recorded in combination with the control signal in the control track of video tape with reference indicating pulses by controlling the velocity of said video tape, comprising the steps of:

A. reproducing said control signal and said indicating pulses from said video tape,
B. counting the number of periods or the number of control pulses of said control signal respectively following each indicating pulse,
C. counting the number of periods or the number of control pulses of said reference control signal respectively following each reference indicating pulse,
D. comparing the numbers of the counted control pulses and the counted reference control pulses,
E. changing the nominal velocity of said video tape so long as the difference of said numbers does not reach a predetermined number, and
F. transporting said video tape with greater velocity than the nominal velocity, if the difference of said compared numbers is smaller than half the number of control pulses between successive indicating pulses.

6. A method for synchronizing the indicating pulses recorded in combination with the control signal in the control track of video tape with reference indicating pulses by controlling the velocity of said video tape, comprising the steps of:

A. reproducing said control signal and said indicating pulses from said video tape,
B. counting the number of periods or the number of control pulses of said control signal respectively following each indicating pulse,
C. counting the number of periods or the number of control pulses of said reference control signal respectively following each reference indicating pulse,
D. comparing the numbers of the counted control pulses and the counted reference control pulses,
E. changing the nominal velocity of said video tape so long as the difference of said numbers does not reach a predetermined number, and
F. transporting said video tape with smaller velocity than the nominal velocity, if the difference of said compared numbers is greater than half the number of control pulses between successive indicating pulses.

7. A system for synchronizing the indicating pulses recorded in combination with the control signal on the control track of video tape with reference indicating pulses by means for controlling the velocity at which said video tape is transported by a means for transporting the video tape, comprising:

A. a first counter for counting the number of periods or pulses of said control signal reproduced from said control track following each indicating pulse separated from the reproduced signal,
B. a second counter for counting the number of periods or pulses of a reference control signal following each reference indicating pulse,
C. a comparator for the counted numbers of periods or pulses for controlling said means for transporting said video tape by changing the velocity of said video tape so long as the difference of said counted number does not reach a predetermined number and by transporting said video tape with the nominal velocity when said predetermined number is achieved.

8. A system for synchronizing the indicating pulses recorded in combination with the control signal on the control track of video tape with reference indicating pulses by means for controlling the velocity at which said video tape is transported by a means for transporting the video tape, comprising:

A. a first counter for counting the number of periods or pulses of said control signal reproduced from said control track following each indicating pulse separated from the reproduced signal,
B. a second counter for counting the number of periods or pulses of a reference control signal following each reference indicating pulse,
C. a comparator for the counted numbers of periods or pulses for controlling said means for transporting said video tape and transporting said video tape with another velocity as the nominal velocity so long as said counted numbers are not equal and transporting said video tape with the nominal velocity if said numbers are equal.

* * * * *